United States Patent
Yang et al.

(10) Patent No.: US 12,182,673 B1
(45) Date of Patent: Dec. 31, 2024

(54) COMPATIBLE MACHINE LEARNING MODEL GENERATION WITHIN RESOURCE CONSTRAINTS

(71) Applicant: Amazon Technologies, Inc., Seattle, WA (US)

(72) Inventors: Shuo Yang, Seattle, WA (US); Hao Zhou, Seattle, WA (US); Yuanjun Xiong, Seattle, WA (US); Wei Xia, Seattle, WA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 909 days.

(21) Appl. No.: 17/315,110

(22) Filed: May 7, 2021

(51) Int. Cl.
*G06N 3/04* (2023.01)
*G06N 20/00* (2019.01)

(52) U.S. Cl.
CPC ........... *G06N 20/00* (2019.01); *G06N 3/04* (2013.01)

(58) Field of Classification Search
CPC ................................ G06N 3/04; G06N 20/00
See application file for complete search history.

(56) References Cited

U.S. PATENT DOCUMENTS

| | | | |
|---|---|---|---|
| 2021/0056378 A1* | 2/2021 | Yang | G06F 16/9024 |
| 2022/0036123 A1* | 2/2022 | Cummings | G06N 20/00 |
| 2023/0063686 A1* | 3/2023 | Li | G06N 3/082 |

OTHER PUBLICATIONS

Xiong, Yunyang, Ronak Mehta, and Vikas Singh. "Resource constrained neural network architecture search: Will a submodularity assumption help?." Proceedings of the IEEE/CVF International Conference on Computer Vision. 2019. (Year: 2019).*

Elsken, Thomas, Jan Hendrik Metzen, and Frank Hutter. "Efficient multi-objective neural architecture search via lamarckian evolution." arXiv preprint arXiv:1804.09081 (2018). (Year: 2018).*

Relja Arandjelovic and Andrew Zisserman. "Three Things Everyone Should Know to Improve Object Retrieval". In CVPR '12: Proceedings of the 2012 IEEE Conference on Computer Vision and Pattern Recognition (CVPR) Jun. 2012 pp. 2911-2918.

Artem Babenko and Victor Lempitsky. "Aggregating Deep Convolutional Features for Image Retrieval", arXiv: 1510.07493v1 [cs.CV] Oct. 26, 2015, pp. 1-9.

Mateusz Budnik and Yannis Avrithis. "Asymmetric Metric Learning for Knowledge Transfer", arXiv:2006.16331v1 [cs.CV] Jun. 29, 2020, pp. 1-16.

Han Cai, Ligeng Zhu, and Song Han. "ProxylessNAS: Direct Neural Architecture Search on Target Task and Hardware", In ICLR, 2019, pp. 1-13.

(Continued)

*Primary Examiner* — Hal Schnee
(74) *Attorney, Agent, or Firm* — S. Scott Foster; Kowert, Hood, Munyon, Rankin & Goetzel, P.C.

(57) ABSTRACT

Machine learning models may be generated that are compatible with another machine learning model and satisfy a resource constraint. Techniques that ensure weight compatibility and architectural compatibility between a machine learning model being created to be compatible with another machine learning model are applied. The resource constraint is enforced so that the generated machine learning model also fits within the resource constraint.

20 Claims, 7 Drawing Sheets

(56) References Cited

OTHER PUBLICATIONS

Ken Chen, Yichao Wu, Haoyu Qin, Ding Liang, Xuebo Liu, and Junjie Yan. "R3 Adversarial Network for Cross Model Face Recognition". In CVPR, 2019, pp. 1-9.
Francois Chollet. "Xception: Deep Learning with Depthwise Separable Convolutions". In CVPR, 2017, pp. 1-8.
Yuying Ge, Ruimao Zhang, Xiaogang Wang, Xiaoou Tang, and Ping Luo. "Deepfashion2: A Versatile Benchmark for Detection, Pose estimation, Segmentation and re-identification of Clothing Images". In 2019 IEEE/CVF Conference on Computer Vision and Pattern Recognition (CVPR) 2019, pp. 1-9.
Zichao Guo, Xiangyu Zhang, Haoyuan Mu, Wen Heng, Zechun Liu, Yichen Wei, and Jian Sun. "Single Path One-Shot Neural Architecture Search with Uniform Sampling". In European Conference on Computer Vision, 2020, pp. 1-16.
Kaiming He, Xiangyu Zhang, Shaoqing Ren, and Jian Sun, "Deep Residual Learning for Image Recognition". Proceedings of the IEEE Conference on Computer Vision and Pattern Recognition (CVPR), 2016, pp. 770-778.
Yihui He, Xiangyu Zhang, and Jian Sun. "Channel Pruning for Accelerating Very Deep Neural Networks". In ICCV, 2017, arXiv:1707.06168v2 [cs.CV] Aug. 21, 2017, Proceedings of the IEEE International Conference on Computer Vision (ICCV), 2017, p. 1389-1397.
Geoffrey Hinton, Oriol Vinyals, and Jeff Dean. "Distilling the Knowledge in a Neural Network". arXiv:1503.02531v1, 2015, pp. 1-9.
Andrew Howard, Mark Sandler, Grace Chu, Liang-Chieh Chen, Bo Chen, Mingxing Tan, Weijun Wang, Yukun Zhu, Ruoming Pang, Vijay Vasudevan, Quoc V. Le, and Hartwig Adam. "Searching for Mobilenetv3". In Proceedings of the IEEE/CVF International Conference on Computer Vision (ICCV), 2019, pp. 1314-1324.
Jie Hu, Rongrong Ji, Hong Liu, Shengchuan Zhang, Cheng Deng, and Qi Tian. "Towards Visual Feature Translation". In Proceedings of the IEEE/CVF Conference on Computer Vision and Pattern Recognition (CVPR), 2019, pp. 3004-3013.
Yannis Kalantidis, Clayton Mellina, and Simon Osindero, "Cross-Dimensional Weighting for Aggregated Deep Convolutional Features", Computer Vision and Machine Learning Group Flickr, Yahoo, In European Conference on Computer Vision, 2016, pp. 685-701.
Changlin Li, Jiefeng Peng, Liuchun Yuan, Guangrun Wang, Xiaodan Liang, Liang Lin, and Xiaojun Chang. "Block-Wisely Supervised Neural Architecture Search with Knowledge Distillation". In Proceedings of the IEEE/CVF Conference on Computer Vision and Pattern Recognition (CVPR), 2020, pp. 1989-1998.
Hao Li, Asim Kadav, Igor Durdanovic, Hanan Samet, and Hans Peter Graf. "Pruning Filters for Efficient ConvNets". Published as a conference paper at ICLR 2017, pp. 1-13.
Hanxiao Liu, Karen Simonyan, and Yiming Yang. "Darts: Differentiable Architecture Search". Published as a conference paper at ICLR 2019, (arXiv: 1806.09055v2 [cs.LG] Apr. 23, 2019) pp. 1-13.
Yu Liu, Xuhui Jia, Mingxing Tan, Raviteja Vemulapalli, Yukun Zhu, Bradley Green, and Xiaogang Wang. "Search to Distill: Pearls are Everywhere But Not the Eyes". In Proceedings of the IEEE/CVF Conference on Computer Vision and Pattern Recognition (CVPR), 2020, pp. 7539-7548.
Zhuang Liu, Mingjie Sun, Tinghui Zhou, Gao Huang, and Trevor Darrell. "Rethinking The Value of Network Pruning". Published as a conference paper at ICLR 2019, pp. 1-21.
Ilya Loshchilov and Frank Hutter. "Sgdr: Stochastic Gradient Descent with Warm Restarts". In ICLR, 2017 (arXiv: 1608.03983v5 [cs.LG] May 3, 2017), pp. 1-16.
Ningning Ma, Xiangyu Zhang, Hai-Tao Zheng, and Jian Sun. "Shufflenet v2: Practical Guidelines for Efficient CNN Architecture Design". In Proceedings of the European Conference on Computer Vision (ECCV), 2018, pp. 116-131.
B. Maze, J. Adams, J. A. Duncan, N. Kalka, T. Miller, C., Otto, A. K. Jain, W. T. Niggel, J. Anderson, J. Cheney, and P. Grother. "Iarpa Janus Benchmark-C: Face Dataset and Protocol". IEEE, In IAPR International Conference on Biometrics (ICB), 2018, pp. 1-8.
Mira Park, Jesse S Jin, and Laurence S Wilson. "Fast content-based image retrieval using quasi-gabor filter and reduction of image feature dimension". In Proceedings fifth IEEE south-west symposium on image analysis and Interpretation, 2002, pp. 1-5.
Adnan Qayyum, Syed Muhammad Anwar, Muhammad Awais, and Muhammad Majid. "Medical image retrieval using deep convolutional neural network". Neurocomputing, v266, pp. 8-20, Nov. 29, 2017.
Filip Radenovic, Giorgos Tolias, and Ondrej Chum. "Fine-tuning CNN image retrieval with no human annotation". IEEE Transactions on Pattern Analysis and Machine Intelligence, v41, Issue 7, pp. 1655-1668, 2018.
Ali S Razavian, Josephine Sullivan, Stefan Carlsson, and At-suto Maki. "Visual instance retrieval with deep convolutional networks". ITE Transactions on Media Technology and Applications, v4, issue 3, Copyright ® 2016 by TE Transactions on Media Technology and Applications (MTA), pp. 251-258, 2016.
M. Sandler, A. Howard, M. Zhu, A. Zhmoginov, and L. Chen. "Mobilenetv2: Inverted residuals and linear bottle- necks". In Proceedings of the IEEE Conference on Computer Vision and Pattern Recognition (CVPR), 2018, pp. 4510-4520.
Yantao Shen, Yuanjun Xiong, Wei Xia, and Stefano Soatto. "Towards backward-compatible representation learning". In Proceedings of the IEEE/CVF Conference on Computer Vision and Pattern Recognition (CVPR), 2020, pp. 6368-6377.
Christian Siagian and Laurent Itti. "Rapid biologically-inspired scene classification using features shared with visual attention". IEEE Transactions on Pattern Analysis and Machine Intelligence, v29, issue 2, pp. 300-312, 2007.
Mingxing Tan, Bo Chen, Ruoming Pang, Vijay Vasudevan, Mark Sandler, Andrew Howard, and Quoc V. Le. Mnasnet: Platform-aware neural architecture search for mobile. In Proceedings of the IEEE/CVF Conference on Computer Vision and Pattern Recognition (CVPR), 2019, pp. 2820-2828.
Giorgos Tolias, Ronan Sicre, and Herve Jegou. Particular object retrieval with integral max-pooling of CNN Activations. eprint arXiv: 1511.05879, 2015, pp. 1-12.
Jasper RR Uijlings, Koen EA Van De Sande, Theo Gev-ers, and Arnold WM Smeulders. "Selective search for object recognition". International Journal of Computer Vision v104, issue 2 pp. 154-171, 2013.
Chien-Yi Wang, Ya-Liang Chang, Shang-Ta Yang, Dong Chen, and Shang-Hong Lai. "Unified representation learning for cross model compatibility". In British Machine Vision Conference (BMVC) 2020, pp. 1-13.
Fei Wang, Liren Chen, Cheng Li, Shiyao Huang, Yanjie Chen, Chen Qian, and Chen Change Loy. "The devil of face recognition is in the noise". In Proceedings of the European Conference on Computer Vision (ECCV), 2018, pp. 765-780.
Feng Wang, Xiang Xiang, Jian Cheng, and Alan Loddon Yuille. Normface: "L2 hypersphere embedding for face verification". In MM '17: Proceedings of the 25th ACM international conference on Multimedia, Oct. 2017, pp. 1041-1049, https://doi.org/10.1145/3123266.3123359.
Hao Wang, Yitong Wang, Zheng Zhou, Xing Ji, Dihong Gong, Jingchao Zhou, Zhifeng Li, and Wei Liu. "Cosface: Large margin cosine loss for deep face recognition". In Proceedings of the IEEE Conference on Computer Vision and Pattern Recognition (CVPR), 2018, pp. 5265-5274.
Christian Wengert, Matthijs Douze, and Herve Jegou. "Bag-of-colors for improved image search". In Proceedings of the 19th ACM international conference on Multimedia, Nov. 2011, pp. 1437-1440, https://doi.org/10.1145/2072298.207203.
Lingxi Xie, Richang Hong, Bo Zhang, and Qi Tian. "Image classification and retrieval are one". In Proceedings of the 5th ACM on International Conference on Multimedia Retrieval, Jun. 2015, pp. 3-10, https://doi.org/10.1145/2671188.2749289.
Andrew Zhai and Hao-Yu Wu. "Classification is a strong baseline for deep metric learning". In BMVC, eprint arXiv: 1811.12649, 2019, pp. 1-12.
Liang Zheng, Shengjin Wang, Ziqiong Liu, and Qi Tian. "Packing and padding: Coupled multi-index for accurate Image retrieval". In (56) References Cited

OTHER PUBLICATIONS

Proceedings of the IEEE Conference on Computer Vision and Pattern Recognition (CVPR), 2014, pp. 1939-1946.

Liang Zheng, Shengjin Wang, Lu Tian, Fei He, Ziqiong Liu, and Qi Tian. "Query-adaptive late fusion for image search and person re-identification". In Proceedings of the IEEE Conference on Computer Vision and Pattern Recognition (CVPR), 2015, pp. 1741-1750.

Wengang Zhou, Yijuan Lu, Houqiang Li, and Qi Tian. "Scalar quantization for large scale image search". In Proceedings of the 20th ACM international conference on Multimedia, Oct. 2012, pp. 169-178, https://doi.org/10.1145/2393347.2393377.

Barret Zoph and Quoc V. Le. "Neural architecture search with reinforcement learning". In ICLR (arXiv:1611.01578v2 [cs.LG] Feb. 15, 2017), pp. 1-16, 2017.

\* cited by examiner

Receive a request to create a first machine learning model that generates an embedding in a vector space that is compatible with embeddings generated by a second machine learning model, the request specifying a resource constraint for the first machine learning model
510

Create the first machine learning model according to an architecture identified using a search technique that satisfies:

a) weight compatibility between the first machine learning model and the second machine learning model;

b) architectural compatibility between the first machine learning model and the second machine learning model; and c) the resource constraint

520

Provide the first machine learning model
530

COMPATIBLE MACHINE LEARNING MODEL GENERATION WITHIN RESOURCE CONSTRAINTS

BACKGROUND

Machine learning models are being increasingly deployed in industries such as health care, finance, and manufacturing. However, the best performing machine learning systems are often quite complex. For instance, convolutional neural networks, one type of machine learning model, achieve state of the art results in computer vision while transformer based models, another type of machine learning model, produce state of the art results in natural language processing. These and other classes of machine learning models tend to utilize large numbers parameters (e.g., millions of parameters).

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of compatible machine learning model generation within resource constraints are described herein. There are many cases where different machine learning models, such as deep neural network models, of the same use case may have to be deployed at the same time. For example, a new version of a deep neural network may be updated while an older version is still in use, or in another example machine learning models with different computational complexities utilizing different amounts of resources are deployed to different systems or devices (e.g., a large, resource intensive machine learning model deployed at cloud services or other large-scale systems and a different smaller machine learning model deployed on edge devices to perform the same task).

In various embodiments, machine learning model compatibility allows for representations, such as embeddings, generated by the different machine learning models to be used interchangeably. Utilizing compatible machine learning models can improve system flexibility by allowing for a compatible machine learning to fit within the resource constraints of a system or device in which it is deployed—while still providing that system or device with the capability to interact with other systems utilizing different machine learning models that can perform the same task. Such techniques may improve the performance of various different types of systems, applications, or services which can utilize compatible machine learning models to perform various tasks.

For example, consider visual search systems that utilize machine learning models. A visual search system in an "open universe" setting is often composed of a gallery model $\phi_g$ and a query model $\phi_q$, both mapping an input image to a vector representation referred to as an embedding. The gallery model $\phi_g$ may be used to map a set of gallery images onto their embedding vectors, a process known as indexing, while the query model extracts embeddings from query images to perform search against the indexed gallery. While some visual search approaches may use the same machine learning model, which is sometimes referred to as a "homogeneous" visual search, other approaches may utilize different model architectures for both $\phi_q$ and $\phi_g$, which may be referred to as heterogeneous visual search.

While the use of the same $\phi_q = \phi_g$ ensures that gallery and query images are mapped to the same vector space where a search is conducted, this scenario provokes an accuracy-efficiency trade-off. For instance, choosing a large, resource-intensive architecture $\phi_g$ for both query and gallery achieves high-accuracy at a loss of resource efficiency, but choosing a small architecture $\phi_q$ may improve resource efficiency to the detriment of accuracy, which is compounded since in practice, indexing only happens sporadically while querying is performed continuously. This leads to efficiency being driven mainly by the query model. Heterogeneous visual search, however, may use a small, resource efficient model $\phi_q$ for querying, and a large model $\phi_g$ for indexing, mitigating the accuracy-complexity trade-off.

Thus, techniques like heterogeneous visual search may take advantage of compatible machine learning model generation within resource constraints, as discussed in detail below, is to ensure that $\phi_g$ and $\phi_q$ live in the same metric (vector) space. For example, compatible machine learning model generation within resource constraints can be done for given architectures $\phi_g$; $\phi_q$, by training the weights so the resulting embeddings are metrically compatible, in some embodiments. By including the architecture in the design of metrically compatible model, a search among architectures Qq for the query images to maximize efficiency while ensuring that performance remains close to that of using a same larger model for both the query and gallery.

Figure 1:
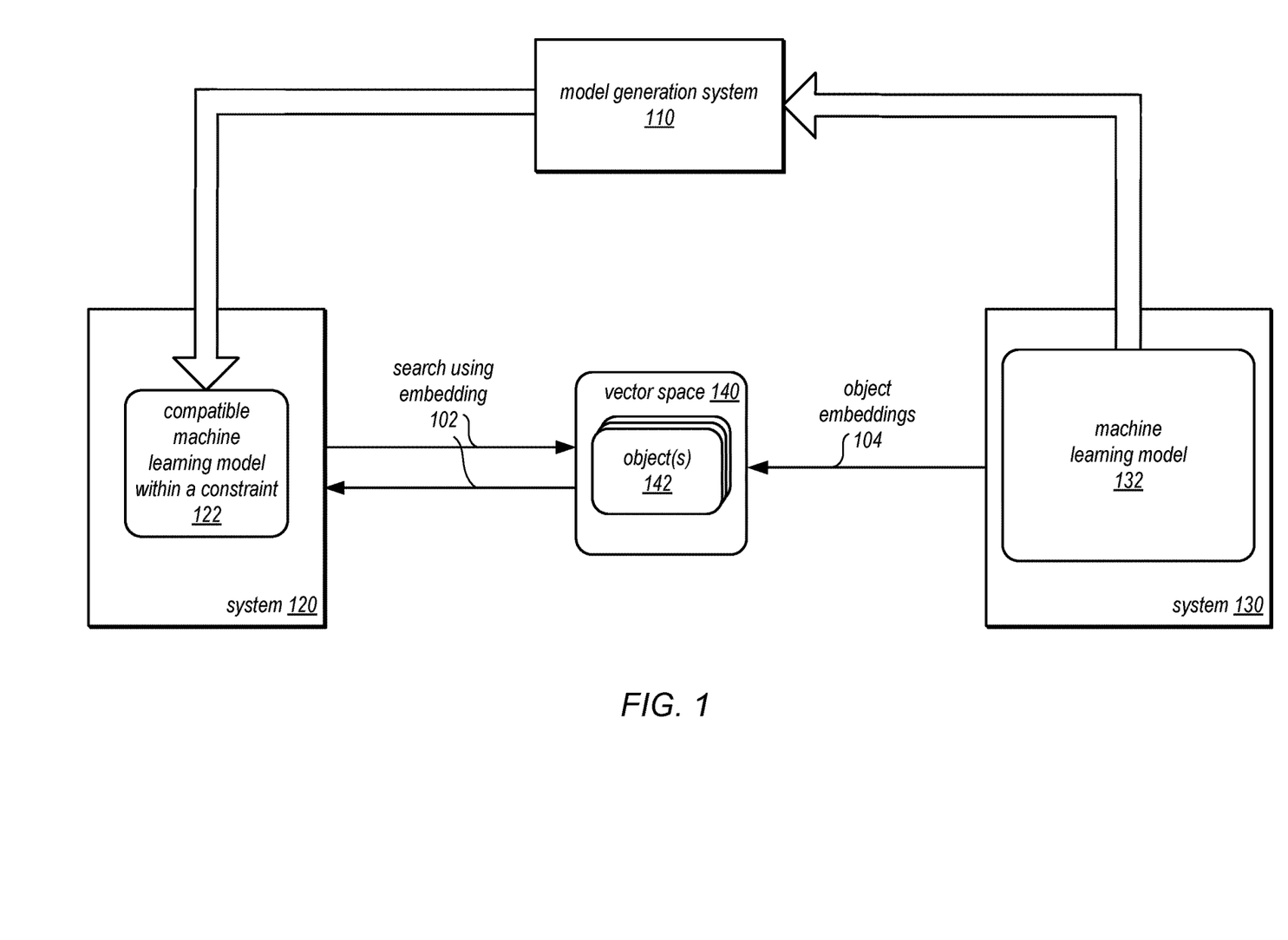
FIG. 1 illustrates a logical block diagram of compatible machine learning model generation within resource constraints, according to some embodiments.

FIG. 1 illustrates a logical block diagram of compatible machine learning model generation within resource constraints, according to some embodiments. Model generation system 110 may implement various techniques for compatible machine learning model generation within resource constraints, as discussed in detail below with regard to FIGS. 3-6. For example, system 130 (e.g., computing system 1000 in FIG. 7 or multiple computing systems, such as those that may implement a service like machine learning model-based search service 210 in FIG. 2) may implement an application, such as the visual search example discussed above, which may utilize machine learning model 132 to map objects 142 (e.g., images) into vector space 140. In order to support other systems, such as system 120, being able to access the objects 142 efficiently, a separate model may be utilized.

For instance, system 120 may perform various searches of objects, to identify matching or similar objects, using an embedding, which represents the searched for object. System 120, however, may have different resources available for executing a machine learning model, and in some cases may have resource constraints (e.g., less available memory, processor capacity, power, etc.) which would not allow for machine learning model 132 to be implemented at system 132. Instead, model generation system 110 may generate a compatible machine learning model 122 that is within the resource constraints of system 120. For example, a request for the compatible machine learning model may be sent to model generation system 110, as discussed below with regard to FIGS. 3 and 5, which may then perform a network architecture search using weights determined for the compatible machine learning model and a reward function that enforces compatibility between machine learning model 132 and a perspective compatible machine learning model to find, train, and provide compatible machine learning model 122.

Please note that the previous description of compatible machine learning model generation within resource constraints is a logical illustration and thus is not to be construed as limiting as to the implementation of model generation systems, systems that utilize machine learning models, or objects searched in vector space.

This specification begins with a general description of a provider network that implements multiple different services, including a machine learning model-based search service, which may generate an index for various types of objects (e.g., video, images, audio, etc.) using a machine learning model and supports requests to search or otherwise access the objects using a query machine learning model. Then various examples of machine learning model-based search service, including different components/modules, or arrangements of components/module that may be employed as part of implementing the machine learning model-based search service are discussed. A number of different methods and techniques to implement compatible machine learning model generation within resource constraints are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
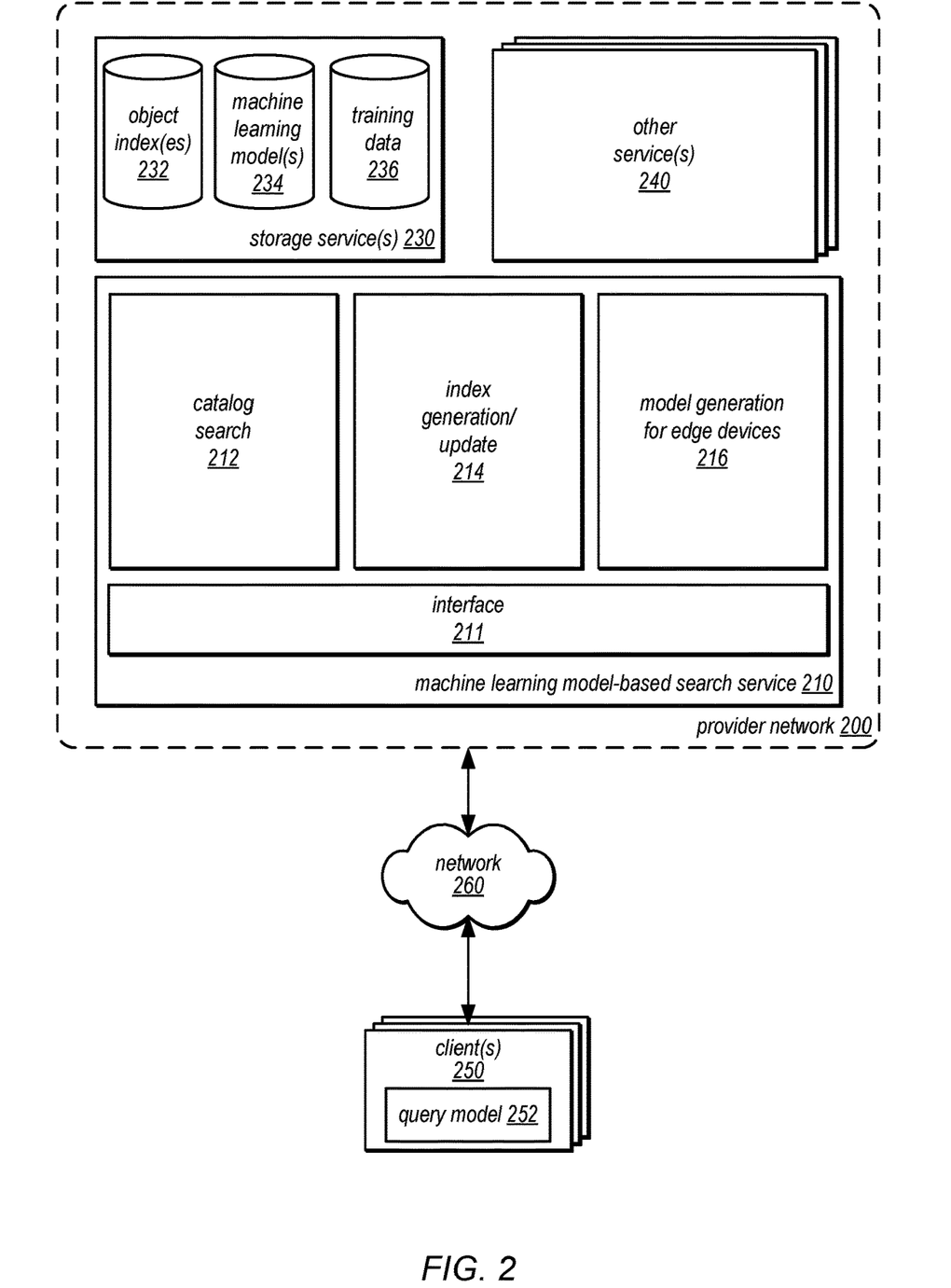
FIG. 2 illustrates an example provider network that may implement a machine learning object search service that provides machine learning model generation within resource constraints, according to some embodiments.

FIG. 2 illustrates an example provider network that may implement a machine learning object search service that provides machine learning model generation within resource constraints, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 200 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 200 may implement various computing resources or services, such as object machine learning model-based search service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine learning model-based search service 210 may be implemented by a particular node or may be distributed across several nodes. In some embodiments, a given node may implement the functionality of more than one service system component (e.g., more than one data store component).

Object recognition service 210 may implement interface 211 to allow clients (e.g., client(s) 250 or clients implemented internally within provider network 200, such as a client application hosted on another provider network service like an event driven code execution service or virtual compute service) to send search requests, add objects, such as image data (which may be found in various types of media, such as still images or video data) or other data (e.g., text/character strings for natural language processing or audio data), requests to create a query model within resource constraints, or requests to search generated object index(es) 232 using a query model that includes an embedding as a reference for performing a search. For example, object recognition service 210 may implement interface 211 (e.g., a graphical user interface, programmatic interface that implements Application Program Interfaces (APIs) and/or a command line interface) may be implemented so that a client can request submit various requests, including. Interface 211 may allow a client to request the performance of analysis (e.g., to search, compare, classify, or label image data content), as discussed in detail below.

Object recognition service 210 may dispatch different requests received via interface 211 to different components. For example, machine learning model-based search service 210 may implement index search 212 to handle various queries or other search requests to objects that are indexed and stored in an object index 232. Various different types of index(es) 232 for various types of model-based search may be implemented, including search for various types of objects using images, face or other human recognition searches, audio, video, or other digital representations of information (e.g., infrared, x-ray, radio or other representations of the electromagnetic spectrum). Index search 212 may support operations, tasks, or workflows to handle search requests by using an embedding received in a search request to locate similar objects represented as embeddings in object index(es) 232 and return the corresponding objects found in the search. For example, a nearest neighbor technique may be used to compare an embedding received in a search request in vector space with other embeddings of indexed objects (e.g., using cosine similarity) to return a number of objects nearest to the embedding of the search request.

In various embodiments, machine learning model-based search service 210 may implement index generation/update 214. Index generation/update 214 may add objects to or create new object catalogs using a corresponding machine learning model (e.g., a gallery model as discussed above), which may generate representations of objects as embeddings. These embeddings may be stored in the appropriate object index 232. Different object index(es) 232 may be created using different machine learning model(s) 234 (e.g., a model trained for visual search, a model trained for searching x-rays, a model for searching audio, etc.). Requests may be received via interface 211 to create new object indexes, including requests that specify a particular machine learning model and/or set of objects to include in the index. Index generation/update 214 may receive these requests, as well as requests to add objects to an index, and apply the corresponding machine learning model to generate and store the embeddings in object index(es) 234. Index generation/update 214 may utilize training data 236, in some embodiments, to train the machine learning model(s) 234 used by index generation/update 214.

In various embodiments, machine learning model-based search service 210 may implement model generation for edge devices 216. As discussed in detail below with regard to FIGS. 3 and 4, model generation for edge devices 216 may generate machine learning models compatible with a machine learning model used to create/update an object index 232 within a resource constraint and provide that machine learning model.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for object recognition service 210 (e.g., a request to search or identify an object using an object recognition index, etc.). For example, a given client 250 may include a suitable version of a web browser, or may include a plug-in module or other type of code module that can execute as an extension to or within an execution environment provided by a web browser. Alternatively, a client 250 may encompass an application such as an application that may make use of machine learning model-based service 210 to implement various applications. For example, a client 250 may utilize a query model 252 (e.g., which may be generated by model generation for edge devices 216) in order to send search requests for various objects in an object index 232, which may be sent via interface 211 and handed by index search 212. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
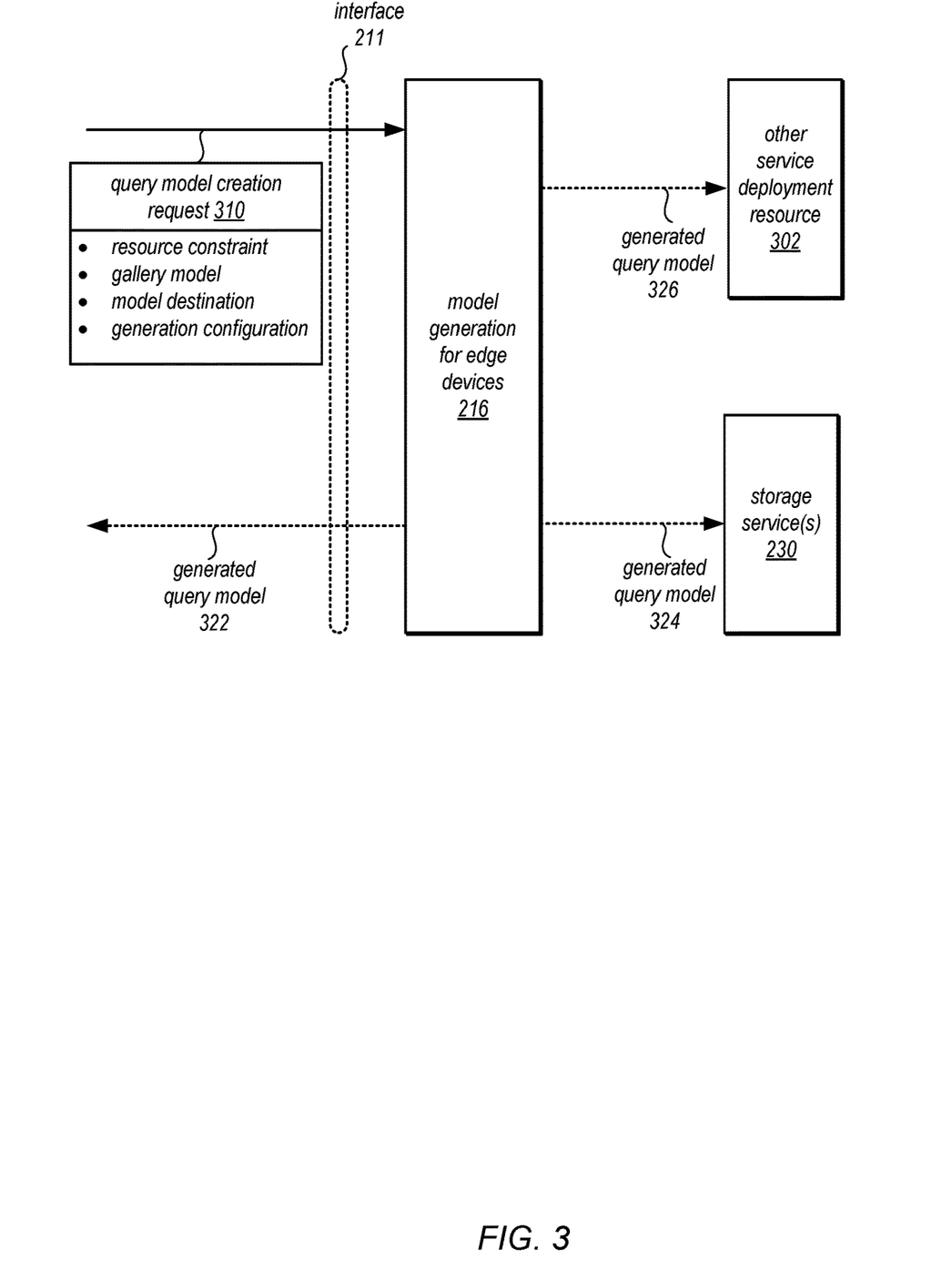
FIG. 3 illustrates a logical block diagram illustrating interactions to request a query model creation request, according to some embodiments.

As noted above, model generation for edge devices 216 may handle requests to create new machine learning models. FIG. 3 illustrates a logical block diagram illustrating interactions to request a query model creation request, according to some embodiments. A query model creation request 310 may be received via interface 211 at model generation for edge devices 216. The request 310 may specify various features for generating the model including a resource constraint, gallery model with which the generated model is to be compatible and/or a destination for the generated model. For example, the resource constraint may be specified as a device profile or execution capacity for a machine learning model (e.g., 120 Mflops (mega floating point operations per second), 300 Gflops, etc.). In some embodiments, the resource constraint may be selected from a provided set of constraints, devices, or scenarios that map to a resource constraint (e.g., selecting edge device type X maps to resource constraint Y). In some embodiments, a gallery model may be specified (e.g., out of a multiple different models used for different galleries). In some embodiments, a default model may be automatically determined for a request (e.g., a visual search service may automatically use the machine learning model used for indexing objects at the visual search service). Various parameters, flags, or other criteria (e.g., hyperparameters) may be specified as part of generation configuration information included query model creation request 310, in some embodiments.

Model generation for edge devices 216 may generate the machine learning model according to the various techniques described below with regard to FIGS. 4-6. In some embodiments, query model creation request may specify or identify a destination for the model (e.g., to be deployed and/or to indicate the resource constraint, as discussed above). For example, creation request 310 may specify another service deployment resource 302, which may be one of various types of virtual computing resources offered by a provider network, such as virtual server that handles requests from client devices, which then submit a request using the generated query model. In such scenarios, model generation for edge devices 216 may send, store, or otherwise provide the generated query model 326 to other service deployment resource. As indicated at 324, a generated query model could also be stored in storage service(s) 230, which may be later accessed to retrieve or obtain the generated query model. As indicated at 322, in some scenarios the generated query model may be returned via interface 211.

Figure 4:
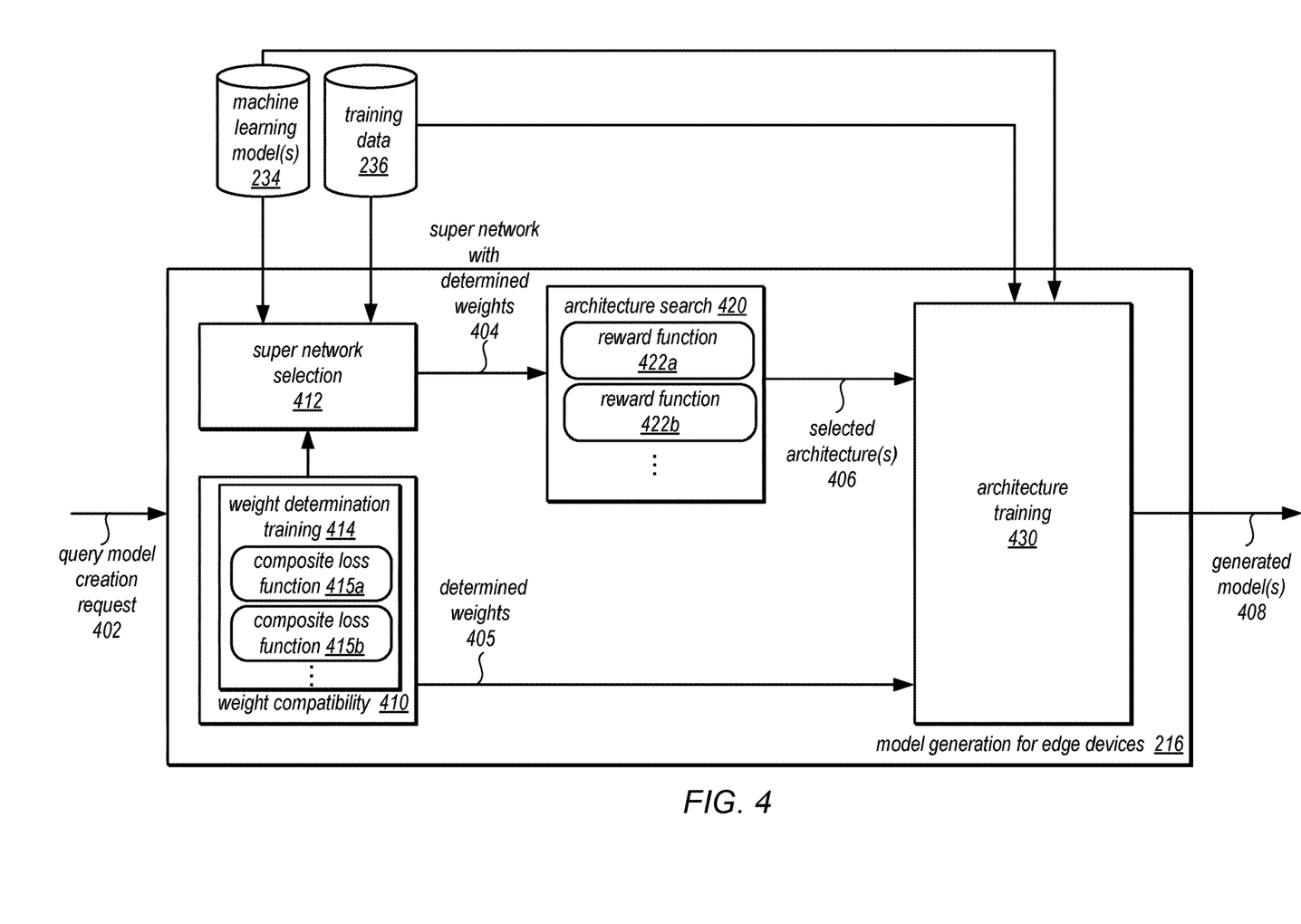
FIG. 4 illustrates a logical block diagram illustrating model generation for edge devices within resource constraints, according to some embodiments.

FIG. 4 illustrates a logical block diagram illustrating model generation for edge devices within resource constraints, according to some embodiments. Model generation may achieve compatibility by optimizing both the model parameters (weights) as well as the model architecture, in various embodiments. Weight inheritance and backward-compatible training (BCT) may be implemented to achieve compatibility through weight optimization. For example, BCT may add an influence loss so that the learned classifier of another embedding model can be used in training the new embedding model. In various embodiments, BCT may be implemented as it works with arbitrary embedding functions, such as $\phi_g$ and $\phi_q$. Neural architecture search (NAS) may be implemented as compatibility aware NAS (which may be referred to as CMP-NAS) strategy that searches for a resource constrained model, like query model da that is maximally efficient while being compatible with øg.

Implementing compatibility aware neural architecture search for generating machine learning models can simultaneously find the query model architecture and its model weights that achieve efficiency similar to that of the smallest (query) model, and accuracy close to that of the paragon (gallery model). Compared with paragon (e.g. a state-of-the-art high-compute homogeneous visual search) methods, query model flops by can be reduced (e.g., by 23 times) with only small loss of search accuracy (e.g., 1:6%) for a task. Generating machine learning models within resource constraints rely upon compatibility awareness allows for a better trade off accuracy and complexity, by optimizing over both model parameters and architecture. In various embodiments, weight-based compatibility may be combined with various reward functions to achieve compatibility-aware architecture search. In this way, compatibility awareness used for generating machine learning models within resource constraints can reduce model complexity many-fold with only a marginal drop in accuracy.

In various embodiments, compatible machine learning model generation techniques described herein may directly optimize the resource constrained model (e.g., the query model) such that its metric space aligns with that of the gallery. This may lead to more flexibility in generating a resource constrained model and allows for the introducing of architecture search in the metric space alignment process. In various embodiments, model compatibility may be evaluated or determined as metric space alignment, is similar to the one in backward-compatible training (BCT). However, only considers compatibility through model weights, whereas, we generalize this concept to the model architecture.

As noted earlier, $\phi$ may be used to denote an embedding model in a search system, like machine learning model-based object search 210, and k to denote the classifier that is used to train $\phi$. Model $\phi$ may be determined by its architecture a and weight w. For a search system, a gallery model may be first trained on a training set T and then used to map each image x in the gallery set G onto an embedding vector $\phi_g(x) \in \mathbb{R}^K$. Note this mapping process may use the embedding model $\phi_g$. During test time, a query model (trained previously on T) may be used to map the query image x' onto an embedding vector $\phi_q(x') \in \mathbb{R}^K$. The closest match, for example, may then be obtained through a nearest neighbor search in the embedding space. Accuracy of search may be measured though some metric, such as top-10 accuracy. Accuracy of the search may be denoted by M ($\phi_q$, $\phi_g$; Q, G). This may be determined by processing query image set Q with $\phi_q$ and processing the gallery set G with $\phi_g$. For simplification the image sets may be omitted and adopt the notation M ($\phi_q$, $\phi_g$) to denote an accuracy metric.

For heterogeneous systems that utilize different machine learning models, the query and gallery models should be compatible. Compatibility may be specified or otherwise enforce through a compatibility rule, such as a compatibility rule which states that:

A smaller model $\phi_q$ is compatible with a larger model $\phi_g$ if it satisfies the inequality M($\phi_q$, $\phi_g$)>M ($\phi_q$, $\phi_q$).

Satisfying such a compatibility rule may be a necessary condition for heterogeneous search. A heterogeneous system violating this condition, e.g., M ($\phi_q$, $\phi_g$)<M ($\phi_q$, $\phi_q$), is not practically useful since the homogeneous system M ($\phi_g$, $\phi_q$) achieves both higher efficiency and accuracy. In addition to satisfying a compatibility rule, a practically useful heterogeneous system may also satisfy M($\phi_q$, $\phi_g$)≈M($\phi_g$, $\phi_g$).

Model generation for edge devices 216 may implement techniques that generate a query model $\phi_q$ compatible with a gallery model $\phi_g$ that satisfy the compatibility rule. While a general treatment may optimize both $\phi_q$ and $\phi_g$, in some embodiments $\phi_g$ may be fixed to a standard large model (e.g., ResNet-101) while the query model $\phi_q$ is optimized. For the subsequent discussion, the gallery model $\phi_g$ has an architecture $a_g$ and is parameterized by weights $w_g$. Corresponding quantities for the query model are $\phi_q$ with architecture $a_g$ and parameterized by weights $w_g$. To train the query and gallery models $\phi_q$, $\phi_g$ a classification-based training with the query and gallery classifiers denoted by $k_q$ and $k_g$ respectively may be used. In this way, model generation for edge devices 216 may generate models with two levels of compatibility-weight level and architecture level.

Model generation for edge devices 216 may receive query model creation request 402, as discussed above with regard to FIG. 3. For example, a resource constraint may be used by super network selection 412 to identify an initial machine learning model train as the super network, from which sub networks can be identified as a generated model. In some embodiments, different computational tiers (e.g., 300, 200, or 100 Mflops) may be identified into which a resource constraint fits. Each computational tier (or other set of resource constraint) may have a corresponding model to use as a super network. For instance, the 300 Mflops tier, may use a super network one type of network architecture. For the 200 and 100 Mflops tiers, the channel widths of the 300 Mflops super network model may be reduced by 0:75 and 0:5 in each layer respectively. In some embodiments, the super network may be trained through a sampling process: In each batch, a new architecture (a sub network) is sampled and only the weights corresponding to it are updated. For sampling a sub network, the parameter free uniform sampling method may be used, in some embodiments. For each layer, the chosen block (includes four choices from 0-3) and channels width (includes ten choices from 0-9) are sampled uniformly. In some embodiments, to train the super network, a warmup phase (e.g., of 10 epochs) may be used, so that the super network may be trained without sampling. During this time, the output of all four blocks in each layer may be combined through averaging while the largest channel width is used.

Model generation for edge devices 216 may implement weight compatibility 410, in various embodiments. Weight compatibility 410 may implement various techniques to determine weight compatibility for a query model that is compatible with a gallery model. Weight-compatibility 410 may implement weight determination training 414, in some embodiments. Weight determination training 414 may take training data 236 and use a composite loss function, such as composite loss function 415a or 415b, as discussed in detail below, to train the super network with determined weights. For example, given a gallery model $\phi_g$ and its classifier $k_g$, weightlevel compatibility aims to learn the weights $w_g$ of query model $\phi_q$ such that the compatibility rule is satisfied. To this end, the optimal query weights $w_q^*$, and its corresponding classifier $k_q^*$ can be learned by minimizing a composite loss 415 over the training set T.

$$w_q^*, k_q^* = \mathrm{argmin}_{w_q, k_q} \{\lambda_1 \mathcal{L}_1(w_q, k_q; T) + \lambda_2 \mathcal{L}_2(w_q, w_g, k_g; T)\}$$

where $\mathcal{L}_1$ is a classification loss such as the Cosine margin, Norm-Softmax and $\mathcal{L}_2$ is the additional term which promotes compatibility. In various embodiments, different training techniques may be used, such as:

Fine-tuning: Initializes $w_q$ using $w_g$ and $k_q$ using $k_g$ and considers $\lambda_2=0$.

Backward-compatible training (BCT): Uses $\mathcal{L}_2 = \mathcal{L}_1 (w_q, k_g; T)$. This ensures that the query embedding model learns a representation that is compatible with the gallery classifier.

In some embodiments, model generation for edge devices 216 may be implemented to solve a two-step optimization problem where the first step amounts to learning the best set of weights-$w_q^*$ (for the embedding model $\phi_q$) and $k_q^*$ (for the common classifier)—by minimizing a classification loss $\mathcal{L}$ over the training set T as below:

$$w_q^*, k_q^* = \mathrm{argmin}_{w_q, k_q} \{\lambda_1 \mathcal{L}(\phi_q(a_q, w_q), k_q; T) + \lambda_2 \mathcal{L}(\phi_q(a_q, w_q), k_g; T)\}$$

where $\mathcal{L}$ can be any classification loss such as Cosine margin, Norm-Softmax. Similar to BCT, the second term $\lambda_2 \mathcal{L}(\phi_q(a_q, w_q), k_g; T)$ ensures that the candidate query embedding model $\phi_q(a_q, w_q^*)$ learns a representation that is compatible with the gallery classifier.

In various embodiments, model generation for edge devices 216 may implement architecture search 420. Architecture search 420 may utilize various search techniques to identify from the super network, a sub network, utilizing reward functions, like reward function 422a or 422b which can consider architectural compatibility. For example, using weights $w_q^*$ and $k_q^*$ from above, the second step amounts to finding the best query architecture at in a search space 22, by maximizing a reward R evaluated on the validation set as below:

$$a_q^* = \mathrm{argmax}_{a_q \in \Omega} R(\phi_q(a_q, w_q^*), k_q^*)$$

With this aim, we design reward functions 422, such as $R_a$ and $R_b$ which include the heterogeneous accuracy in their formulation, which may be described as $$R_a = M(\phi_q(a_q, w_q), \phi_g)$$

$$R_b = M(\phi_q(a_q, w_q), \phi_q(a_q, w_q)) \times M(\phi_q(a_q, w_q), \phi_g)$$

Various different search techniques may be implemented. In some embodiments, evolutionary search techniques may be used which perform evolutionary computation methods to score the fitness of populations between generations using evolutionary methods until stop criteria is satisfied. Other neural architecture search techniques, however, may be implemented in other embodiments.

In various embodiments, that search space for generating a query model may utilize the super network. For example, a super-network may include 20 sequentially stacked choice blocks. Each choice block can select one of four operations: k×k convolutional blocks (k ∈3,5,7) (e.g., inspired by ShuffleNetV2) and a 3×3 Xception inspired convolutional block. Additionally, each choice block can also select from 10 different channel choices 0.2=2.0 x. During training, a composite loss function 415 can be used to train the super network whereby, in each batch a new architecture is sampled uniformly and only the weights corresponding to it are updated, in some embodiments.

As noted earlier, in some embodiments architecture search 420 may search for the most compatible architecture using an evolutionary search technique. The evolutionary search technique may be fitted with different reward functions 422b, such as the examples given above. In this way, the search is fast because each architecture inherits the weights from the super network.

In some embodiments, model generation for edge devices 216 may provide one (or more) architectures 406 to architecture training 430. For example, a number of architectures (e.g., the top five) according to their reward function score could be selected and provided, or just one architecture could be provided (e.g., the top one). Although the selected architectures 406 could be used with the determined weights, in some embodiments, architecture training 430 may train the selected architectures using the training data 236 to generate re-trained model(s) which may be provided, as indicated at 408. For example, for searching for a query model architecture, a validation set can be split from the training set 236 (e.g., 10% of the training set is used for validation). The search technique for architecture 420 may use the super network 404 trained using the other split portion of the training data (e.g., the 90%). Then during search, each sub network may be evaluated on the held out validation split (e.g., the other 10%). Then the selected architecture(s) 406 may be re-trained on the train split (e.g., the 90%). As indicated at 405, determined weights 405 that provide for cross search accuracy between the potential query models generated from selected architecture(s) 406 may be used by architecture training 430 as part of evaluating a reward function for training selected architecture(s) 406.

Although FIGS. 2-4 have been described and illustrated in the context of a provider network implementing a machine learning model-based object search service, the various components illustrated and described in FIGS. 2-4 may be easily applied to other systems that utilize a compatible machine learning model generation within resource constraints. As such, FIGS. 2-4 are not intended to be limiting as to other embodiments of compatible machine learning model generation within resource constraints.

Figure 5:
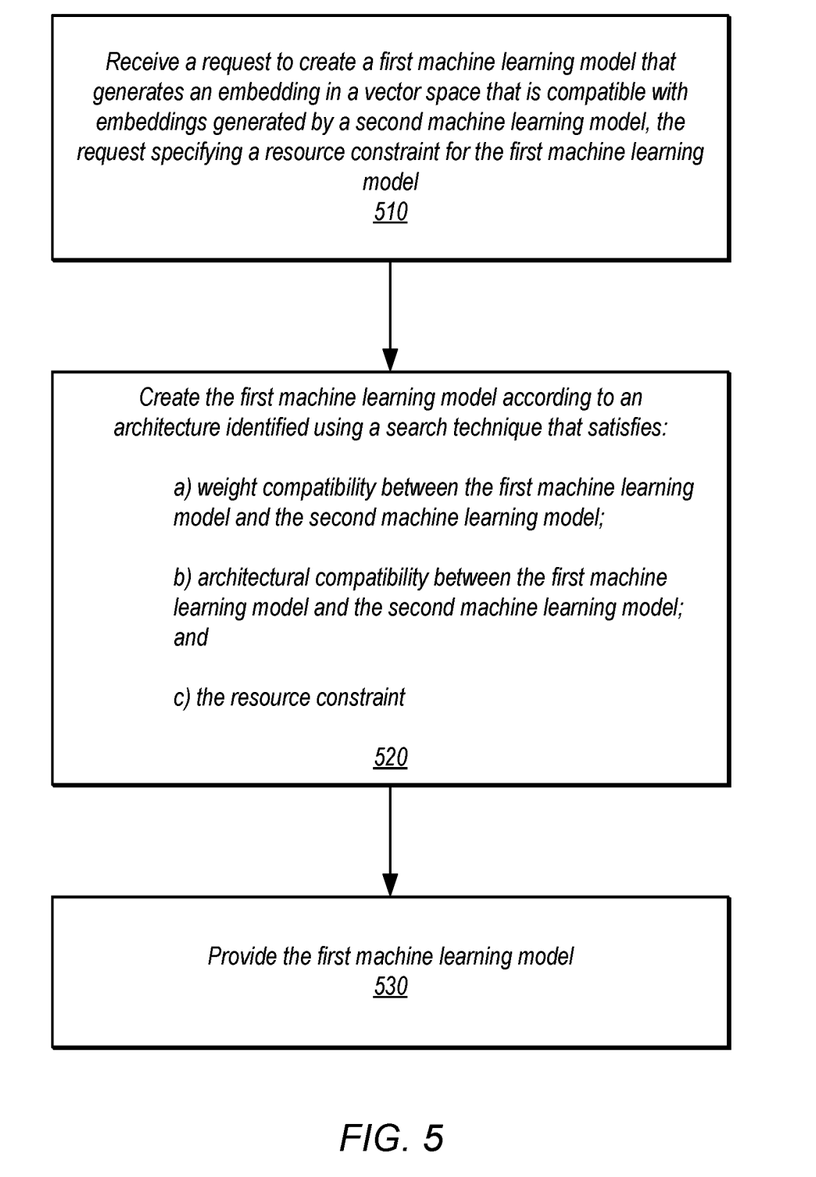
FIG. 5 illustrates a high-level flowchart of various methods and techniques to implement compatible machine learning model generation within resource constraints, according to some embodiments.

FIG. 5 illustrates a high-level flowchart of various methods and techniques to implement compatible machine learning model generation within resource constraints, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a request may be received to create a first machine learning model that generates an embedding in a vector space that is compatible with embeddings generated by a second machine learning model, in some embodiments. For example, the request may be received through an API or other user interface, such as a command line or graphical user interface. As discussed above with regard to FIG. 3, the request may specify various information including a resource constraint, gallery model with which the generated model is to be compatible and/or a destination for the generated model. For example, the resource constraint may be specified as a profile or execution capacity for a machine learning model (e.g., 120 Mflops (mega floating point operations per second), 300 Gflops, etc.). In some embodiments, the resource constraint may be selected from a provided set of constraints, devices, or scenarios that map to a resource constraint (e.g., selecting edge device type X maps to resource constraint Y). In some embodiments, the second machine learning model may be specified (e.g., out of a multiple different models used for different galleries or other heterogeneous model systems). In some embodiments, a default model may be automatically determined for a request (e.g., a visual search service may automatically use the machine learning model used for indexing objects at the visual search service). Various parameters, flags, or other criteria (e.g., hyperparameters) may be specified as part of generation configuration information included query model creation request 310, in some embodiments.

As indicated at 520, the first machine learning model may be created according to an architecture identified according to a search technique, in various embodiments. For example, as discussed above with regard to FIG. 3, and below with regard to FIG. 6, weight compatibility between the first machine learning model and the second machine learning model. As discussed above, a composite loss function that accounts for both the accuracy of the first and second machine learning models may be used. Architectural compatibility between the first and second machine learning models may be satisfied. For example, as discussed above with regard to FIG. 3 and below with regard to FIG. 6, a reward function that incorporates both the first machine learning model and second machine learning model may be utilized with a search technique. The resource constraint may also be satisfied. For example, the search space (e.g., a super network as discussed above) may be selected or otherwise limited to those possible architectures that would fit within the resource constraint.

As indicated at 530, the first machine learning model may be provided, in some embodiments. For example, a specified destination (e.g., for deployment), storage location, or interface may be used to return the first machine learning model that was generated, in some embodiments (e.g., as discussed above with regard to FIG. 3). In some embodiments, more than one model may be returned (e.g., if more than one possible model is generated that satisfies compatibility and the resource constraint (e.g., so that different models can be executed for comparison at an edge or other device that was intended to host the models).

Figure 6:
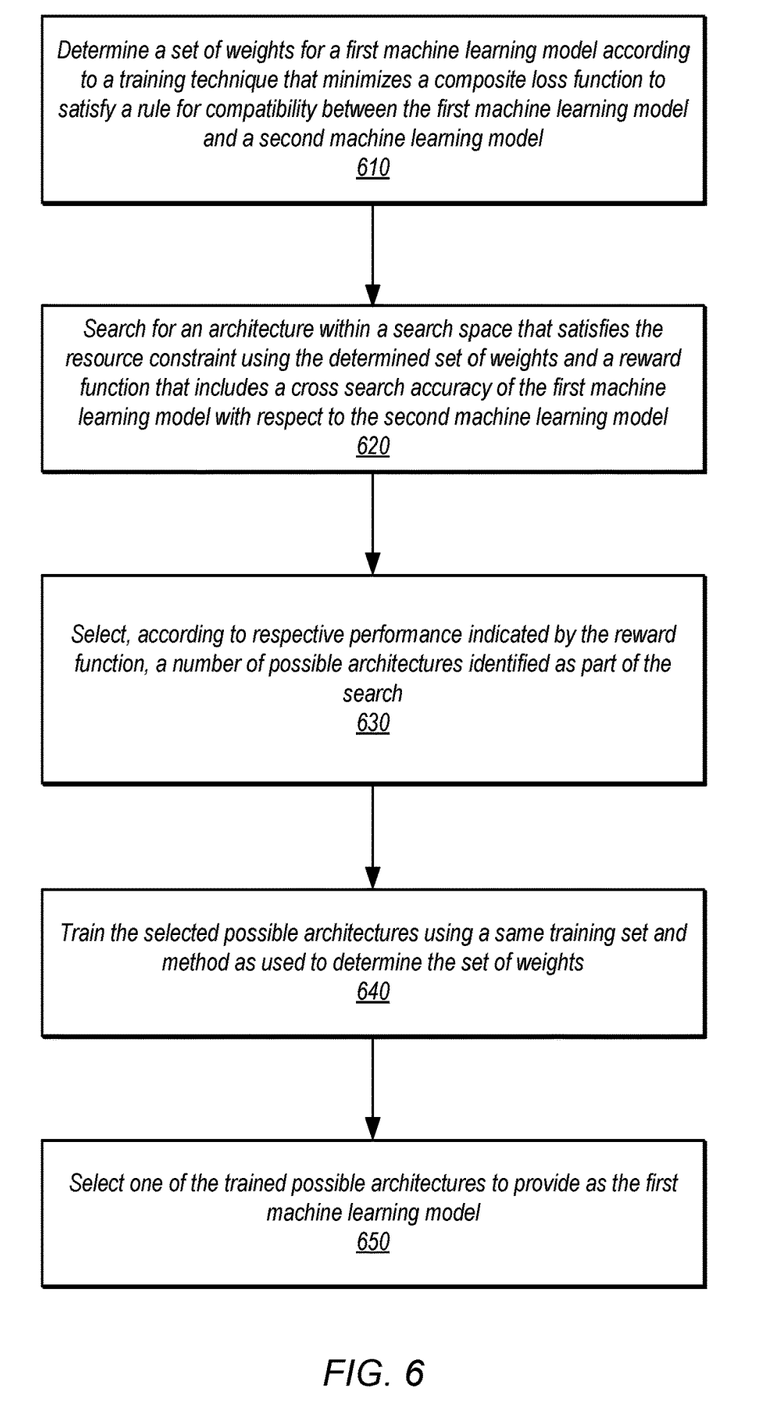
FIG. 6 illustrates a high-level flowchart of various methods and techniques to implement weight and architectural compatibility search for generating a compatible machine learning model, according to some embodiments.

FIG. 6 illustrates a high-level flowchart of various methods and techniques to implement weight and architectural compatibility search for generating a compatible machine learning model, according to some embodiments. As indicated at 610, a set of weights may be determined for a first machine learning model according to a training technique that minimizes a loss function to satisfy a rule for compatibility between the first machine learning model and a second machine learning model, in some embodiments. For example, as discussed above a super network may be identified that fits within the resource constraints for the first machine learning model. A training technique may be applied (e.g., fine tuning or BCT) to train the weights of the super network.

As indicated at 620, a search for an architecture within a search space that satisfies the resource constraint may be performed using the determined set of weights and a reward function that includes the cross search accuracy of the first machine learning model with respect to the second machine learning model, in some embodiments. For example, the search space may be the super network, which may be selected according to the resource constraint (e.g., a super network may not exceed the resource constraints) or may be sampled or otherwise search so as not to produce an architecture that exceeds the resource constraint. As discussed above, different reward functions may be used, such as a reward function like $R_a$ above that includes asymmetric accuracy between the two machine learning models or $R_b$ which includes both symmetric and asymmetric accuracy of the two models.

As indicated at 630, a number of possible architectures identified as part of the search may be selected according to respective performance as indicated by the reward function. For example, a top five performing architectures may be selected, in some embodiments. As indicated at 640, the selected possible architectures may be trained using a same training set and training technique as was used to determine the set of weights, in some embodiments. For example, the split portion for training (as discussed above) may be used to train the selected possible architectures (instead of using the determined weights of the super network) along with the training technique (e.g., BCT or fine-tuning). As indicated at 650, one of the trained possible architectures may be selected to provide as the first machine learning model. For example, the retrained models may be tested using the other portion of the training data set that was split for architecture search, so that the best performing trained possible architecture is selected.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
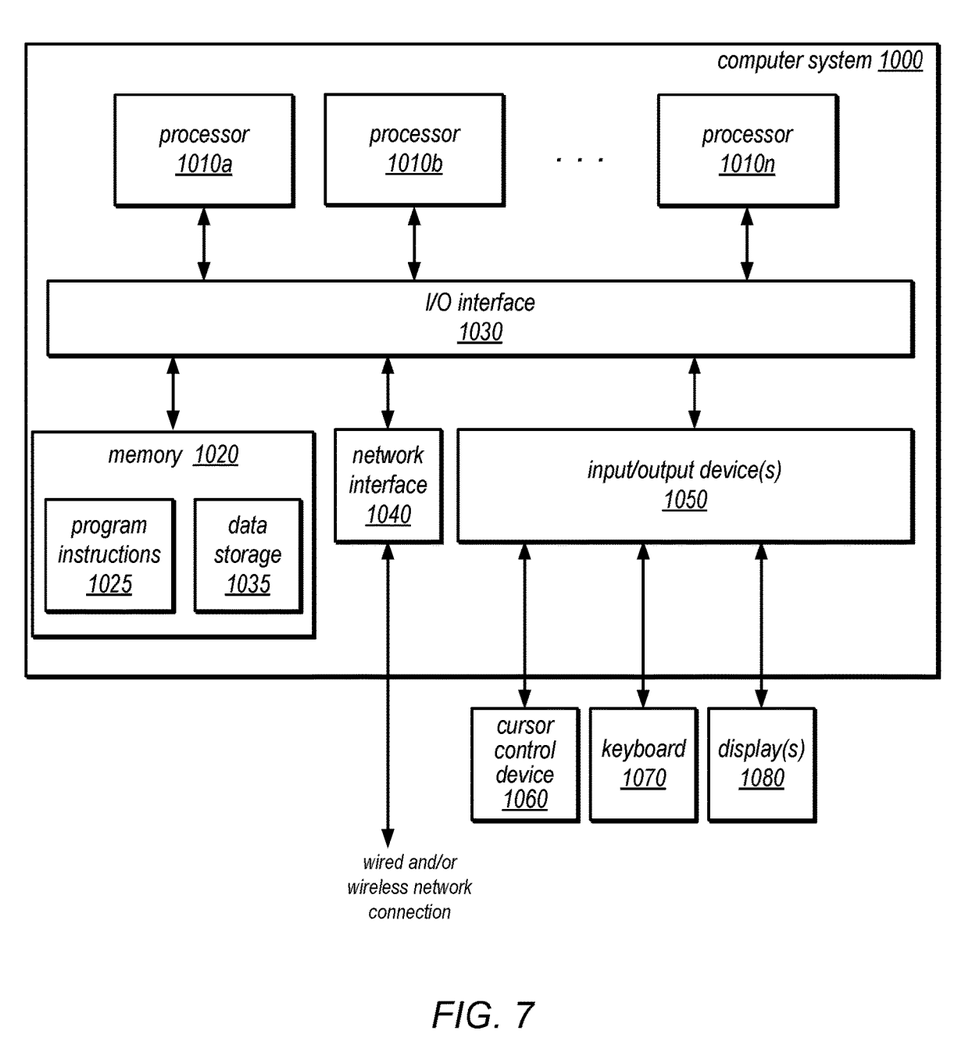
FIG. 7 illustrates an example system to implement the various methods, techniques, and systems described herein, according to some embodiments.

Embodiments of compatible machine learning model generation within resource constraints as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
   receive a request to create a query machine learning model that generates an embedding in a vector space used to query for objects corresponding to embeddings generated by a gallery machine learning model, the request specifying a resource constraint for the query machine learning model; and
   responsive to the request:
   create the query machine learning model according to an architecture identified using a search technique that satisfies:
   weight compatibility between the query machine learning model and the gallery machine learning model;
   architectural compatibility between the query machine learning model and the gallery machine learning model; and
   the resource constraint; and
   provide the query machine learning model.

2. The system of claim 1, wherein to create the query machine learning model, the program instructions cause the at least one processor to:
   determine a set of weights for the query machine learning model according to a training technique that minimizes a composite loss function to satisfy a rule for compatibility between the query machine learning model and the gallery machine learning model; and
   search for the architecture within a search space that satisfies the resource constraint using the determined set of weights and a reward function that includes cross search accuracy of the query machine learning model with respect to the gallery machine learning model.

3. The system of claim 2, wherein the reward function includes asymmetric accuracy that indicates the cross search accuracy and symmetric accuracy that indicates the query machine learning model compared with the query machine learning model.

4. The system of claim 1, wherein the query machine learning model is provided to a client device of a provider network, wherein the gallery model is hosted by a network-based service of the provider network that performs visual search in response to search requests received from the client device using the query machine learning model.

5. A method, comprising:
   receiving, at a model generation system, a request to create a first machine learning model that generates an embedding in a vector space that is compatible with embeddings generated by a second machine learning model, the request specifying a resource constraint for the first machine learning model; and
   creating, by the model generation system, the first machine learning model according to an architecture identified using a search technique that satisfies:
   weight compatibility between the first machine learning model and the second machine learning model;
   architectural compatibility between the first machine learning model and the second machine learning model; and
   the resource constraint; and
   providing, by the model generation system, the first machine learning model.

6. The method of claim 5, wherein creating the first machine learning model comprises:
   determining a set of weights for the first machine learning model according to a training technique that minimizes a composite loss function to satisfy a rule for compatibility between the first machine learning model and the second machine learning model; and
   searching for the architecture within a search space that satisfies the resource constraint using the determined set of weights and a reward function that includes cross search accuracy of the first machine learning model with respect to the second machine learning model.

7. The method of claim 6, wherein the training technique used to determine a set of weights for the first machine learning model is Backwards Compatibility Training (BCT).

8. The method of claim 6, wherein the reward function includes asymmetric accuracy that indicates the cross search accuracy.

9. The method of claim 6, wherein creating the first machine learning model further comprises training the identified architecture using a training data set and a training method used to determine the set of weights for the first machine learning model.

10. The method of claim 5, wherein the search technique is an evolutionary search technique.

11. The method of claim 5, wherein the resource constraint is specified as a number floating point operations per second (flops).

12. The method of claim 5, wherein the request specifies the second machine learning model.

13. The method of claim 5, wherein the second machine learning model is implemented as part of a network-based service offered by a provider network that performs search requests on behalf of clients.

14. One or more non-transitory, computer-readable storage media, storing program instructions that when executed on or across one or more computing devices cause the one or more computing devices to implement:
  receiving a request to create a first machine learning model that generates an embedding in a vector space that is compatible with embeddings generated by a second machine learning model;
  responsive to the request:
    identifying a resource constraint for executing the first machine learning model based on the request;
    creating the first machine learning model according to an architecture identified using a search technique that satisfies:
      weight compatibility between the first machine learning model and the second machine learning model;
      architectural compatibility between the first machine learning model and the second machine learning model; and
      the resource constraint; and
    providing the first machine learning model.

15. The one or more non-transitory, computer-readable storage media of claim 14, wherein, in creating the first machine learning model, the program instructions cause the one or more computing devices to further implement:
  determining a set of weights for the first machine learning model according to a training technique that minimizes a composite loss function to satisfy a rule for compatibility between the first machine learning model and the second machine learning model; and
  searching for the architecture within a search space that satisfies the resource constraint using the determined set of weights and a reward function that includes a cross search accuracy of the first machine learning model with respect to the second machine learning model.

16. The one or more non-transitory, computer-readable storage media of claim 15, wherein the training technique used to determine a set of weights for the first machine learning model is fine tuning.

17. The one or more non-transitory, computer-readable storage media of claim 15, wherein the reward function includes asymmetric accuracy that indicates the cross search accuracy and symmetric accuracy that indicates the query machine learning model compared with the query machine learning model.

18. The one or more non-transitory, computer-readable storage media of claim 14, wherein, in creating the first machine learning model, the program instructions cause the one or more computing devices to further implement training the identified architecture using a training data set and training technique used to determine the set of weights for the first machine learning model.

19. The one or more non-transitory, computer-readable storage media of claim 14, wherein the resource constraint is identified according to a device type specified in the request.

20. The one or more non-transitory, computer-readable storage media of claim 14, wherein the second machine learning model is implemented as part of a network-based service offered by a provider network that performs search requests on behalf of clients.

* * * * *